United States Patent
Gieshoff et al.

(10) Patent No.: US 6,334,986 B2
(45) Date of Patent: Jan. 1, 2002

(54) PROCESS FOR THE SELECTIVE CATALYTIC REDUCTION OF THE NITROGEN OXIDES CONTAINED IN A LEAN EXHAUST GAS

(75) Inventors: Jürgen Gieshoff, Biebergemünd; Hans Van Den Tillaart, Freigericht; Thomas Kreuzer, Karben; Egbert Lox, Hanau; Jürgen Lang, Kirchheim-Teck, all of (DE)

(73) Assignee: Degussa AG, Hanau (DE)

(*) Notice: Subject to any disclaimer, the term of this patent is extended or adjusted under 35 U.S.C. 154(b) by 0 days.

(21) Appl. No.: 09/757,581

(22) Filed: Jan. 11, 2001

Related U.S. Application Data

(63) Continuation of application No. 09/493,288, filed on Jan. 28, 2000, now abandoned.

(30) Foreign Application Priority Data

Jan. 29, 1999 (DE) .............................................. 199 03 533

(51) Int. Cl.[7] .................................................. B01D 53/58
(52) U.S. Cl. ................................... 423/239.1; 423/213.2; 423/239.2; 423/DIG. 10
(58) Field of Search ............................. 423/213.2, 239.1, 423/239.2, DIG. 10

(56) References Cited

U.S. PATENT DOCUMENTS

| 5,711,147 A | 1/1998 | Vogtlin, et al. | 60/274 |
| 6,176,078 B1 * | 1/2001 | Balko et al. | 60/274 |

FOREIGN PATENT DOCUMENTS

| DE | 195 10 804 A1 | 9/1996 | |
| EP | 0 376 025 A1 | 7/1990 | |
| EP | 0 385 164 A2 | 9/1990 | |
| EP | 0 814 241 A1 | 12/1997 | |
| EP | 0 861 972 A1 | 9/1998 | |
| JP | 58060614 A * | 4/1983 | C01C/1/04 |

OTHER PUBLICATIONS

Oda, et al., *Journal of Electrostatics* 42 (1997) 151–157.

* cited by examiner

Primary Examiner—Steven P. Griffin
Assistant Examiner—Maribel Medina
(74) Attorney, Agent, or Firm—Smith, Gambrell & Russell, LLP

(57) ABSTRACT

The invention relates to a process for the selective catalytic reduction of the nitrogen oxides contained in a lean exhaust gas from internal combustion engines by reducing the nitrogen oxides by means of ammonia on a catalyst. The process is characterized in that, in addition to the lean exhaust gas, a rich gas stream is produced that is treated in an electrical gas discharge plasma in order to form the ammonia required for the reduction.

27 Claims, 6 Drawing Sheets

PROCESS FOR THE SELECTIVE CATALYTIC REDUCTION OF THE NITROGEN OXIDES CONTAINED IN A LEAN EXHAUST GAS

This application is a continuation of U.S. patent application Ser. No. 09/493,288, abandoned, filed Jan. 28, 2000, and which is incorporated herein by reference.

INTRODUCTION AND BACKGROUND

The present invention relates to a process for the selective catalytic reduction of nitrogen oxides contained in a lean-mix exhaust gas from combustion engines by reducing the nitrogen oxides by means of ammonia on a catalyst.

Combustion engines with a lean exhaust gas concern diesel engines and lean-running petrol engines, i.e. so-called lean-mix engines. Compared to stoichiometrically operated conventional engines, diesel engines and lean-mix engines are characterized by an up to 20% lower fuel consumption. A substantial problem of these engines is the purification of their exhaust gases. Although the oxidizable harmful components of the exhaust gas (hydrocarbons HC, carbon monoxide CO and minor amounts of hydrogen $H_2$) can on account of the high oxygen content in the exhaust gas of up to 15 vol.% easily be converted on a catalyst to carbon dioxide and water, the nitrogen oxides $NO_x$ however that are also formed in the combustion of the fuel cannot, on account of the preferably occurring oxidation reactions, be reduced in sufficient amount to nitrogen $N_2$.

In order to solve this problem the process of selective catalytic reduction (SCR) already known in the case of stationary combustion units has been proposed. In this process a reducing agent is added to the lean exhaust gas, by means of which the nitrogen oxides can be selectively reduced on a catalyst suitable for this purpose. Ammonia, which reacts with a high selectivity with the nitrogen oxides to form nitrogen and water, is preferably used as reducing agent. The ratio of added ammonia to the nitrogen oxides that are present is about 1:1. Ammonia can be produced directly from urea with the aid of a hydrolysis catalyst or by decomposition of a corresponding salt (e.g. carbamate).

At the present time much effort is being expended on attempts to incorporate such systems in lorries and trucks. A disadvantage of this process is that a further operating material has to be employed. The high expenditure associated with the SCR technology has up to now prevented its widespread use, in particular in passenger cars. As an alternative to ammonia, there may also be used alcohols, hydrogen or hydrocarbons as reducing agent. These reducing agents however have considerably worse selectivities than ammonia for the nitrogen oxide reduction in the lean exhaust gas. Thus, a nitrogen oxide conversion of up to 30% is obtained in officially prescribed driving cycles using the alternative reducing agents, whereas conversions of 70% or more are possible with ammonia.

The selective catalytic reduction with ammonia thus provides very good results, but involves a considerable expenditure on equipment, which up to now has limited its widespread use in smaller engines.

It is therefore an object of the present invention to provide a process for the selective catalytic reduction with ammonia that is characterized by a simple production of the ammonia required for the reduction.

SUMMARY OF THE INVENTION

The above and other objects can be achieved by a process for the selective catalytic reduction of the nitrogen oxides contained in a lean exhaust gas from internal combustion engines with one or more cylinders, by reducing the nitrogen oxides by means of ammonia on a reduction catalyst. The process is characterized by the following process stages:

a) production of a rich gas stream with a normalized air/fuel-ratio of less than 1,
b) formation of ammonia in the rich gas stream by reaction of its components with one another,
c) combination of the lean exhaust gas with the rich gas stream, and
d) reduction of the nitrogen oxides contained in the lean exhaust gas on a reduction catalyst using the resultant ammonia as reducing agent.

The normalized air/fuel-ratio ($\lambda$) describes the composition of the gas stream, and refers to the air/fuel ratio standardized to stoichiometric conditions. Stoichiometric conditions exist at a normalized air/fuel-ratio of 1. With a normalized air/fuel-ratio greater than 1 the gas contains more oxygen than is necessary for a complete combustion of the combustible constituents. Such a gas composition is termed lean. A rich gas composition exists when the oxygen content is less than is required for a complete combustion of all combustible constituents of the gas.

An essential feature of the process according to the invention is the production of the ammonia required for the catalytic reduction from a rich gas stream by the reaction of its components with one another. Such a gas stream may be produced for example by a burner that is operated with a sub-stoichiometric air/fuel mixture ($\lambda < 1$). The rich gas stream can also be obtained as part of the exhaust gas from the combustion engine if one cylinder of the engine is operated with a sub-stoichiometric air/fuel mixture. It is also possible to form the rich gas stream by injecting hydrocarbons into an air stream.

A rich exhaust gas contains for example, in addition to noncombusted hydrocarbons, also carbon monoxide, nitric oxide and water vapour. Ammonia can be formed from these last three substances according to the following reaction equation:

$$5CO + 2NO + 3H_2O \rightarrow 5CO_2 + 2NH_3 \quad (1)$$

Nitric oxide is thus reduced by means of carbon monoxide to ammonia. The formation of ammonia is not restricted to a chemical reaction according to the above overall reaction equation. For example it is also possible to react hydrogen with nitrogen-containing gas components or with nitrogen to form ammonia.

This reduction may be carried out in various ways. It is possible to initiate the above reaction merely by thermal activation, in other words by heating the rich exhaust gas. Of course, the reverse reaction also increases with increasing temperature, and for this reason reaction pathways in which the exhaust gas does not have to be thermally heated are more favourable. An example of a convenient reaction pathway is to carry out the reaction on a suitable catalyst. As a rule the catalytic reaction requires lower temperatures, which means that the influence of the reverse reaction can be reduced.

It has now been found that ammonia can also be formed in a rich gas stream by passing the latter through an electrical gas discharge plasma. The formation of ammonia in an electrical gas discharge is thermodynamically favoured since the reaction proceeds at substantially lower temperatures than the catalytic reduction.

BRIEF DESCRIPTION OF DRAWINGS

The invention is illustrated in more detail with the aid of FIGS. 1 to 9, wherein:

FIG. 12 is a graph of absorption bands of ammonia in the rich synthesis gas mixture after flowing through the plasma reactor with the gas discharge on.

DETAILED DESCRIPTION OF THE INVENTION

Figure 1:
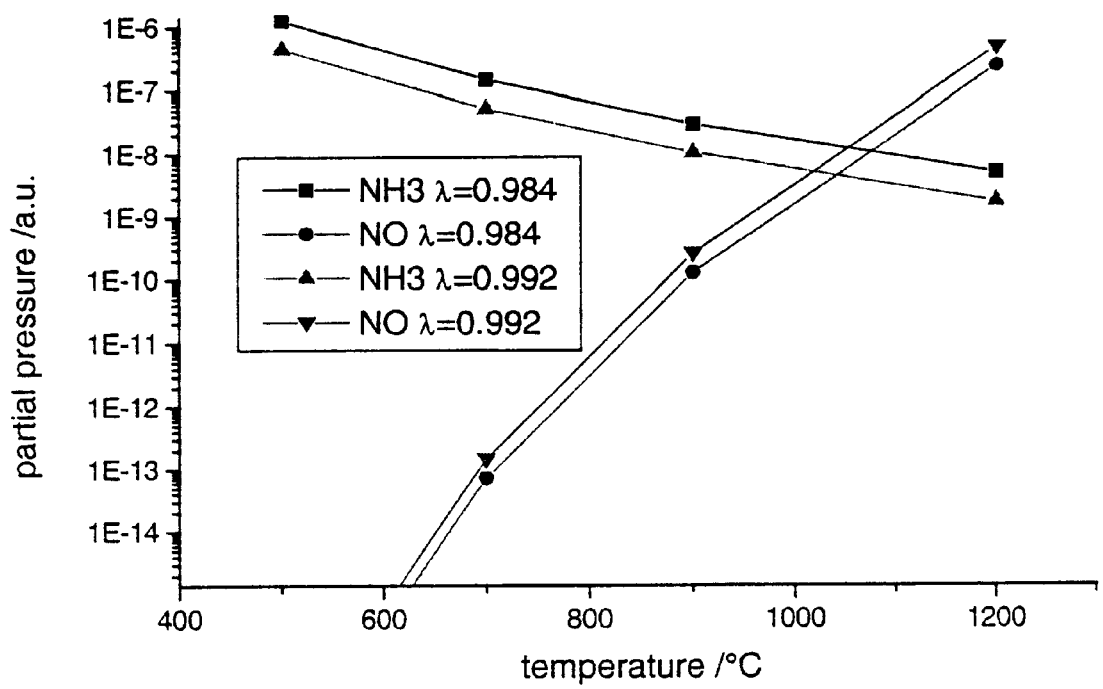
FIG. 1 is a graph showing the formation of ammonia and nitric oxide by thermal splitting of cetane ($C_8H_{18}$)

FIG. 1 shows the formation of ammonia and nitric oxide by thermal splitting of cetane ($C_8H_{18}$). The illustrated curves are obtained by thermodynamical calculations for two different normalized air/fuel-ratios ($\lambda=0.984$) and ($\lambda=0.992$) of the adopted gas mixture. The formation of ammonia decreases with increasing temperature. At the same time the formation of nitric oxide increases sharply above 600° C.

An electrical gas discharge is preferably used for the formation of ammonia. Suitable for example are microwave discharges, also discharges with frequencies above 250 MHz, corona discharges and dielectrically hindered discharges, also termed barrier discharges. Combinations of these electrical gas discharges are also suitable. Barrier discharges are preferably used for the proposed process.

A barrier discharge can be produced between two metal electrodes, at least one of which is coated with a dielectric that prevents a spark or arc formation between the two metal electrodes. Instead, a plurality of brief and spatially highly localized microdischarges are formed, whose discharge duration and energy content are limited by the dielectric. Suitable dielectrics are ceramic materials, glass, porcelain or insulating plastics such as for example Teflon®.

Barrier discharges may be operated at pressures of between 0.1 and 10 bar. The electrical excitation of the discharge is effected by applying an alternating voltage to the electrodes. Depending on the pressure in the discharge space, interspacing of the electrodes, and frequency and amplitude of the alternating voltage, thin, spatially and timewise statistically distributed discharge channels of only a few nanoseconds duration are formed when a sparking potential is exceeded.

Figure 2:
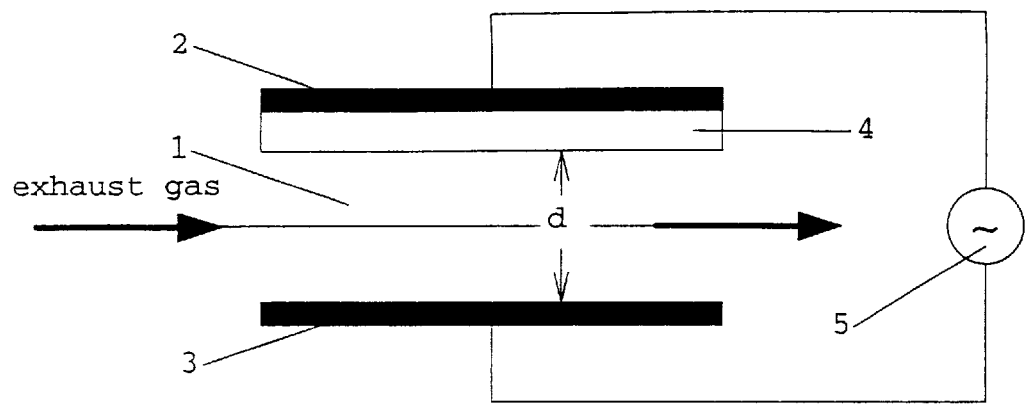
FIG. 2 is a schematic diagram of a dielectric barrier discharge with parallel, flat electrodes; unilaterally dielectrically hindered discharge.

FIG. 2 shows the basic construction of a plasma reactor in which a dielectric barrier discharge can be ignited. (2) and (3) denote two metal electrodes arranged opposite one another and connected to an alternating voltage source (5). In order to suppress the formation of a discharge arc between the two electrodes, the electrode (2) is coated with a dielectric (4). Such a discharge is described as being unilaterally dielectrically hindered.

By applying an alternating voltage to the two electrodes the desired discharge occurs at a sufficiently high voltage. The necessary voltage depends on the free distance "d" between the dielectric and counterelectrode, on the dielectric that is used as well as the pressure in the discharge space, on the gas composition, and on any internal fittings there may be between the dielectric in the discharge space. The distance "d" is preferably adjusted to between 0.1 and 10 mm. The necessary voltages may be from 0,2 to 15 kV. The frequency of the alternating voltage may be selected between 50 Hz and 250 kHz. These alternating voltages may also be operated in a pulsed manner at low frequency (10 to 0.01 Hz) in order for example to permit the reaction of adsorbed species.

Figure 3:
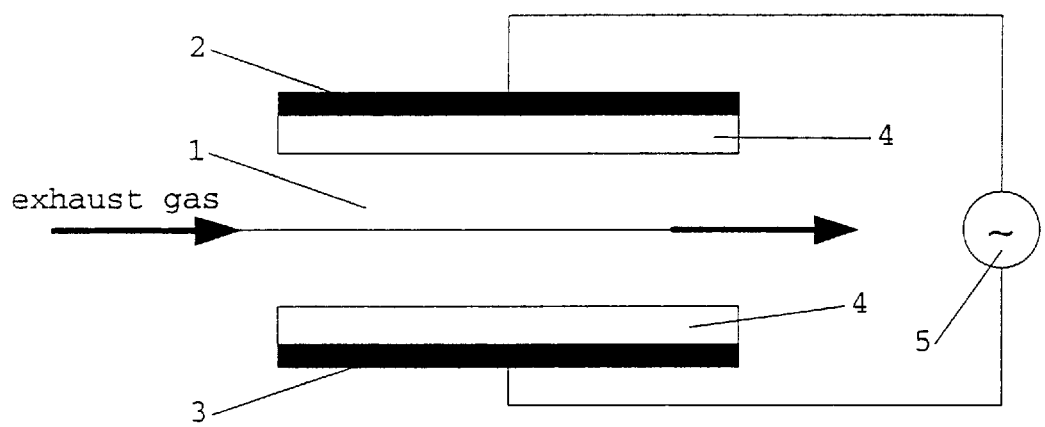
FIG. 3 is a schematic diagram of a dielectric barrier discharge with parallel, flat electrodes; bilaterally dielectrically hindered discharge.

FIG. 3 shows a modification of the arrangement of FIG. 2. In FIG. 3 both electrodes are coated with a dielectric. The gas discharge forming in the discharge space is therefore described as bilaterally dielectically hindered.

Figure 4:
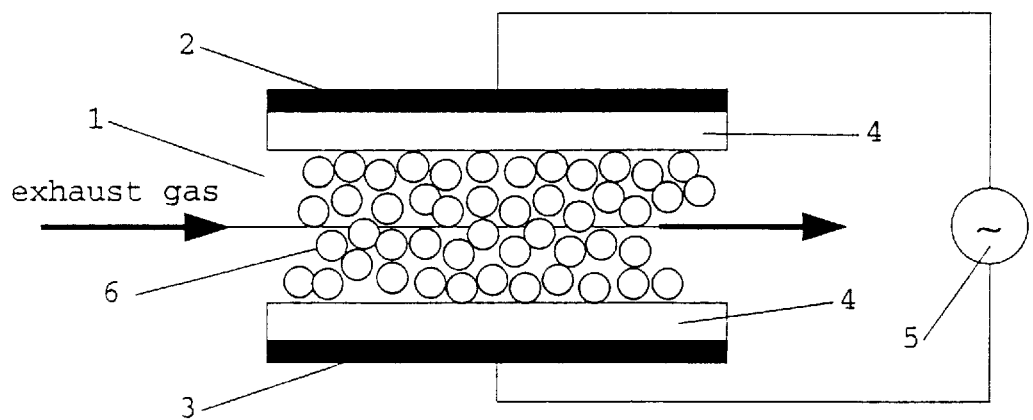
FIG. 4 is a schematic diagram of a dielectric barrier discharge with parallel, flat electrodes; bilaterally dielectrically hindered; discharge space filled with pellets.

FIG. 4 shows a particularly advantageous arrangement of the plasma reactor. The discharge space is filled with pellets. The pellets may consist of catalytically active materials or materials having special chemical properties or surface properties. Also, inert ceramic spheres have a positive influence on the formation of the electrical discharge. The electrical discharge that is formed in a reactor filled with pellets occurs primarily in the form of sliding discharges at the surface of the pellets. The concentration of ions and radicals in the spatial vicinity of the surface is thereby increased. The formation of ammonia in the gas discharge can be promoted by using catalytically active pellets.

The catalytically active pellets preferably consist of at least one finely particulate support material selected from the group consisting of aluminum oxide, titanium oxide, zirconium oxide, cerium oxide, silicon dioxide, magnesium oxide, their mixed oxides and zeolites. The support materials may be stabilized in a manner known per se with silicon dioxide and/or rare earth oxides against thermal stresses. Also, the support materials can be catalytically activated by depositing at least one of the noble metals of the platinum group, in particular platinum, palladium, rhodium and iridium, in a highly dispersed form on their surface. For this purpose the specific surface of the support materials should be at least 10 $m^2/g$ (measured according to DIN 66132). Furthermore, it is advantageous if the ceramic pellets additionally contain at least one basic oxide of the alkali or alkaline earth metals of the periodic system of the elements.

In addition to the pellets or as an alternative to the latter, the dielectric on the electrode surfaces may be provided with a catalytically active layer comprising finely particulate support materials and catalytically active components whose composition may correspond to the afore-described composition for the ceramic pellets. In specific applications the dielectric may be formed as a catalytically active layer comprising finely particulate support materials and catalytically active components on the electrode surfaces themselves. The precondition for this is that the insulation action of the layer satisfies the requirements of a dielectrically hindered discharge.

The electrodes of the plasma reactor may be formed as flat plates aligned parallel to one another, or may be formed by two tubular electrodes arranged concentrically with respect to one another and whereby the electrical discharge is generated in the space between the two opposing electrodes. In case of the parallel plate reactor at least one of the electrodes is coated on the mutually opposite faces with a dielectric. In case of the concentrical arrangement of two tubular electrodes at least one of them is coated with a dielectric on the mutually opposite jacket surfaces.

In order to facilitate the formation of discharge filaments spatial inhomogeneities may be provided by employing three-dimensional structured electrode surfaces that result in high localized electrical field strengths and thus to the formation of the discharge. As is known from the literature, the coupled electron energy in a plasma discharge depends on the product of the electrode interspacing "d" and pressure "p" ($d*p$), with the result that at constant gas pressure specific radical reactions can be promoted or alternatively suppressed in the plasma simply by altering the geometry of the reactor. For the proposed process the product of the electrode interspacing and pressure should be in the range between 0.05 and 100 mm*bar.

The discharge can be excited by various types of alternating voltages. For a high electron density and as simultaneous a formation as possible of the discharge throughout the whole discharge space of the reactor, pulsed excitation voltages having a frequency of between 50 Hz and 250 kHz are particularly suitable.

The reactor may be fabricated from any electrically and thermally suitable material. Plastics, ceramic materials and glasses may in particular be mentioned. Hybrid constructions of various metals are also possible.

All SCR catalysts known from the prior art may be used as catalyst for the selective catalytic reaction. By way of example there may be mentioned the catalysts described in U.S Pat. No. 4,916,107, U.S. Pat. No. 5,116,586 and U.S. Pat. No. 5,300,472. U.S. Pat. No. 4,916,107 and U.S. Pat. No. 5,300,472 describe catalysts based on titanium oxide. These catalysts contain in particular:

a) titanium dioxide;
b) at least one oxide of tungsten, silicon, boron, aluminum, phosphorus, zirconium, barium, yttrium, lanthanum and cerium, and
c) at least one oxide of vanadium, niobium, molybdenum, iron and copper.

U.S. Pat. No. 5,116,586 discloses an SCR catalyst based on zeolites that contains copper, iron, molybdenum, cerium or mixtures thereof on a mordenite type zeolite. This and the above U.S. patents describing the SCR catalysts are relied on and incorporated herein by reference for that purpose.

Moreover, SCR catalysts are also known that contain as catalytically active component at least one platinum group metal in a highly dispersed form on a suitable support material. As support materials there may be used magnesium oxide, aluminum oxides, silicon oxide, titanium oxide, zirconium oxide and their mixtures.

The aforementioned catalysts may exist in the form of pellets or may be extruded to form monolithic structures, in particular honeycomb bodies. So-called coating catalysts may also be used, in which the catalyst is applied in the form of a layer to an inert support body.

The proposed process is intended to reduce the concentration of nitrogen oxides in oxygen-rich, i.e. lean exhaust gases, by selective catalytic reduction by means of ammonia. In order to generate the ammonia a rich, low-oxygen gas stream for example in the form of an exhaust gas partial stream, is required according to the invention.

Figure 5:
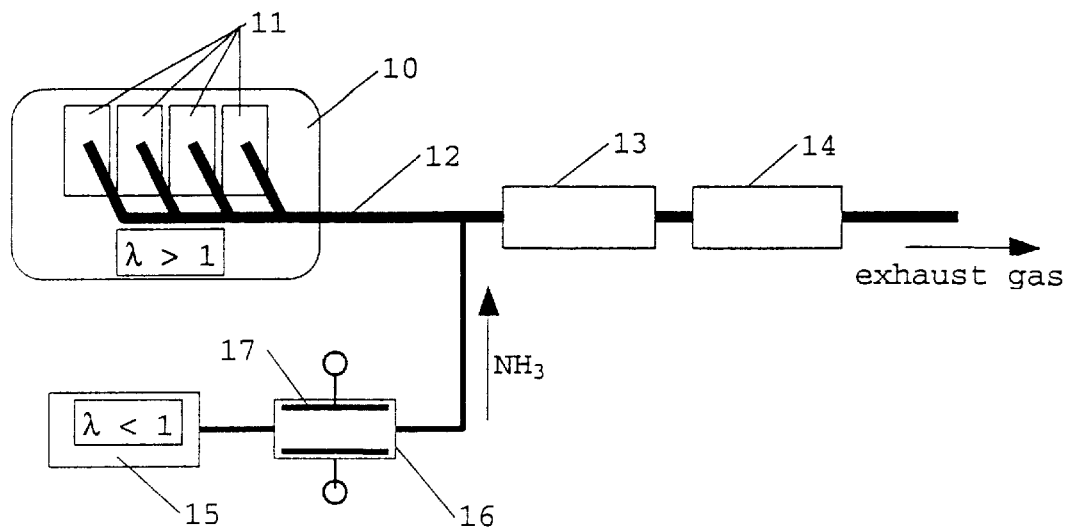
FIG. 5 is a schematic representation of an internal combustion engine with additional, sub-stoichiometric burner for producing a rich exhaust gas partial stream.
Figure 6:
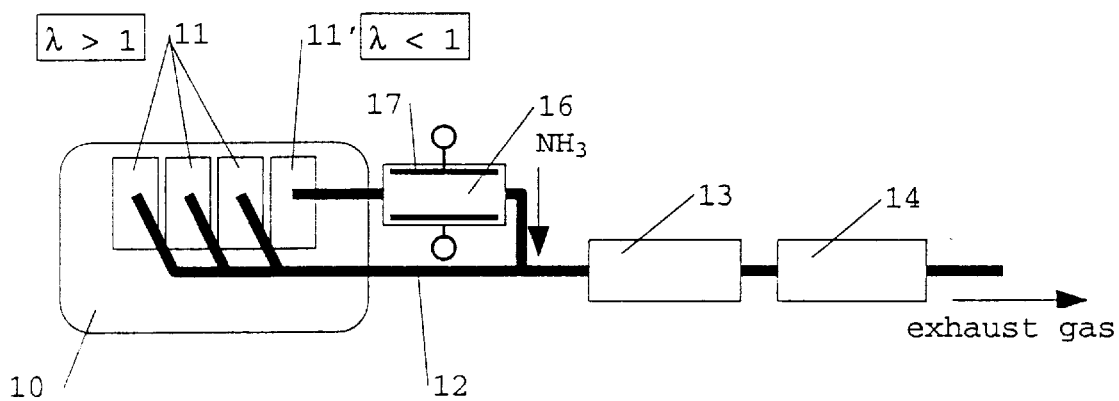
FIG. 6 is a schematic representation of an internal combustion engine with separate regulation of the cylinders for producing a rich exhaust gas partial stream.

FIGS. 5 and 6 illustrate by way of example two different possible ways of carrying out the process on a vehicle.

FIG. 5 shows an internal combustion engine (10) with four cylinders (11). The engine is operated with a lean air/fuel mixture, i.e. the normalized air/fuel-ratio $\lambda$ is greater than 1 ($\lambda > 1$). Since the normalized air/fuel-ratio is not altered by the combustion in the engine, the exhaust gas from the machine also has a normalized air/fuel-ratio of more than 1.

"The lean exhaust gas from the four cylinders is collected in the exhaust gas pipe (12) and first passed over a catalyst for the selective reduction (13) and then over an oxidation catalyst (14). The oxidation catalyst (14) is optional Its purpose is to oxidize ammonia in the event of a possible excess of ammonia and thus prevent an emission of ammonia."

In order to generate the rich exhaust gas partial stream, an additional burner (15) is provided in FIG. 5 that is operated with a sub-stoichiometric air/fuel mixture ($\lambda < 1$). A heating unit installed in the vehicle may preferably be used for this purpose. In the fuel economy vehicles considered here, such a heating unit is often required in order to heat the passenger compartment. The exhaust gas from the burner is passed through the electrical gas discharge of a plasma reactor (16) in order to form ammonia, and is then mixed in front of the catalyst for the selective catalytic reduction, with the exhaust gas from the internal combustion engine. Reference number (17) denotes the electrode of the plasma reactor.

The heating unit thus fulfils on the one hand the object of providing additional heating for the passenger compartment, and on the other hand constitutes a simple controllable component for generating a rich exhaust gas partial stream. In order to improve the ammonia yield, a heat exchanger that cools the exhaust gas can be installed between the burner and electrical gas discharge. The heating efficiency is thus only reduced on account of the slightly fuel-rich mode of operation, but not through a removal of thermal energy.

FIG. 6 shows a further possible way of producing a rich exhaust gas partial stream. Here (10) denotes the internal combustion engine with four cylinders (11) and (11'). In this case the engine is a direct injection petrol or diesel engine with controllable injection for each cylinder. The cylinders (11) are operated with a lean air/fuel mixture ($\lambda > 1$), and cylinder (11') is operated with a rich air/fuel mixture ($\lambda < 1$). The plasma reactor (16) for generating ammonia is situated in the exhaust gas pipe from this cylinder (11').

The two process stages (generation of a rich gas stream and the formation of ammonia) may also be combined in one stage. This may be effected for example by injecting fuel together with a sub-stoichiometric amount of air into a plasma reactor.

Figure 7:
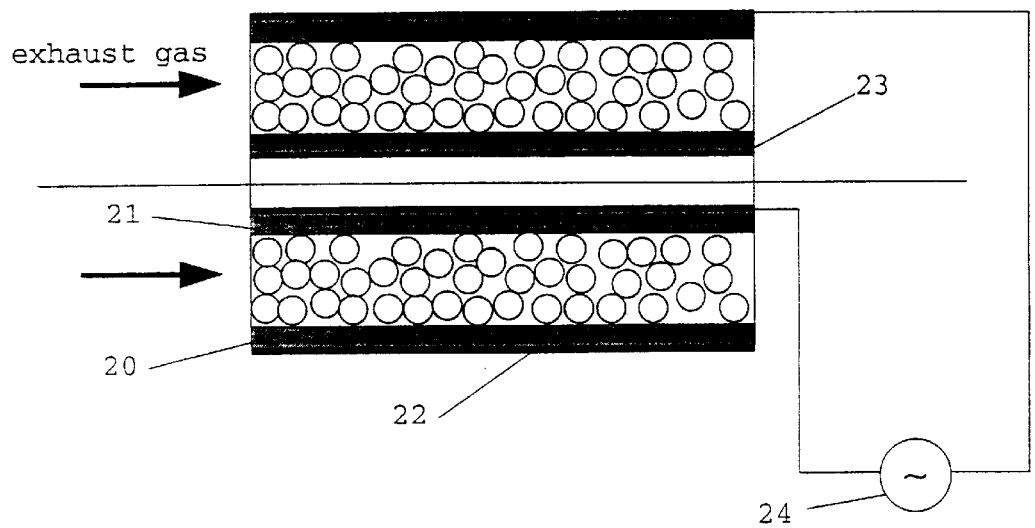
FIG. 7 is a schematic diagram of a coaxial reactor with palladium pellet catalyst.

FIG. 7 shows a coaxial plasma reactor. (20) denotes an outer pipe and (21) an inner pipe of quartz glass. The internal surface of the inner pipe and the external surface of the outer pipe are covered with metal electrodes (23) and (22). A dielectric barrier discharge can be ignited in the annular interspace between the inner pipe and outer pipe by applying a voltage source (24) to these electrodes.

Figure 8:
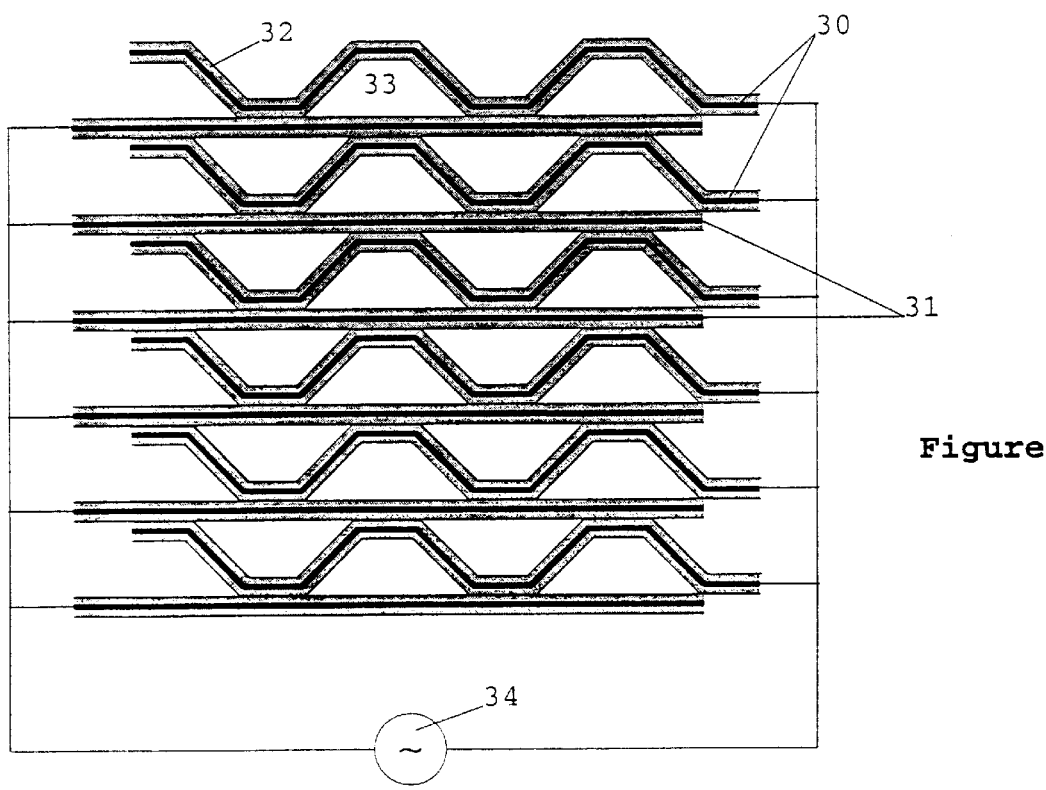
FIG. 8 is a schematic diagram of a reactor with honeycomb structure.

FIG. 8 shows the cross-section through a reactor of honeycomb construction, perpendicular to the flow channels (33) for the exhaust gas. The honeycomb body consists of alternating layers of smooth (31) and corrugated (30) metal sheets that are coated on both sides with a dielectric (32). The smooth sheets are connected via a common electrical lead to one pole of the high voltage source (34) and the corrugated sheets are connected to the second pole of the voltage source. An electrical discharge is produced in each flow channel (33) transverse to the flow of the exhaust gas by applying a voltage. The coating of the metal sheets with the dielectric electrically insulates the adjacent sheets from one another. Either the smooth or corrugated sheets or both types of sheets may be coated with a dielectric to achieve electrical insulation from one another. Instead of the dielectric coating it is also possible to insert a dielectric intermediate layer between adjacent sheets. This intermediate layer may for example be a ceramic sheet.

On account of the small cross-sectional dimensions of the flow channels, the discharge voltage may be chosen to be correspondingly low. The length of the honeycomb bodies is not restricted. In FIG. 8 corrugated and smooth metal sheets are combined with one another to form a sheet stack. Two metal sheets having different corrugations may however also be combined with one another. The type of corrugation as well as the cross-sectional dimensions of the flow channels may be adapted to particular application requirements.

Also, with this reactor a catalyst layer of finely divided support materials and catalytically active components may be applied to the dielectric layers that insulate the metal sheets against the gas discharge and also insulate the sheets from one another. Alternatively, the dielectric sheets themselves may be formed as a catalytically active layer if comprising finely divided support materials and catalytically active components this layer produces an insulating effect that is sufficient to meet the requirements of the dielectrically hindered discharge. The composition of this catalytically active layer may correspond to the already described composition of the ceramic pellets.

The proposed process has various advantages compared to the known processes. It may for example be used in different designs of engine. When used in lean-burn engines the fuel consumption figures are only slight worse. The generation of ammonia in situ in the vehicle, without the need to include additional operating materials, is of particular advantage. The necessary amount of ammonia can be adjusted through the electrical and geometrical parameters of the gas discharge as well as by the provision of the rich exhaust gas partial stream. This adjustment procedure can be controlled by the engine electronics.

EXAMPLE

The coaxial reactor of FIG. 7 was used for the following investigations. Both the outer and inner pipes consisted of 2 mm thick quartz glass. The outer pipe had an external diameter of 4 cm and the inner pipe an internal diameter of 2.6 cm. The length of the reactor was 20 cm and the length of the electrodes 16 cm. The gas discharge space between the two quartz pipes was filled with a palladium pellet catalyst (3.2 g of palladium and 35 g of barium oxide per 1 litre of γ-aluminum oxide pellets).

The synthesis gas mixture shown in Table 1 was passed through the reactor at a volume flow of 4.5 Nl/min at atmospheric pressure and a temperature of 100° C. The product d*p was 6 mm*bar. A barrier discharge was ignited in the reactor by applying an alternating voltage having a frequency of 1kHz and an amplitude of about 11 kV. The measurements were carried out at room temperature.

TABLE 1

Composition of the synthesis gas mixture

| Substance | Concentration (Vol. - %) at T = 293 K |
|---|---|
| $N_2$ | 77 |
| $O_2$ | 13 |
| $H_2O$ | 10 |
| NO | 500 ppm |
| Total | 100 |

The synthesis gas mixture of Table 1 is lean, in other words it has a supra-stoichiometric oxygen content (the normalized air/fuel-ratio λ is greater than 1). Under these conditions nitric oxide is adsorbed by the pellet catalyst when the gas discharge is switched on. This can be explained by the conversion of NO to $NO_2$ in the plasma reactor under excess air, and subsequent further oxidation and accumulation as $NO_3$ If the exhaust gas composition is switched from a lean composition to a rich composition, then a desorption of the previously absorbed nitric oxide takes place. At the same time ammonia is formed in the gas discharge, which very effectively converts the desorbed nitric oxide to nitrogen and water.

In the present example the changeover from lean to rich exhaust gas was effected by disconnecting the oxygen supply and connecting carbon monoxide.

Figure 9:
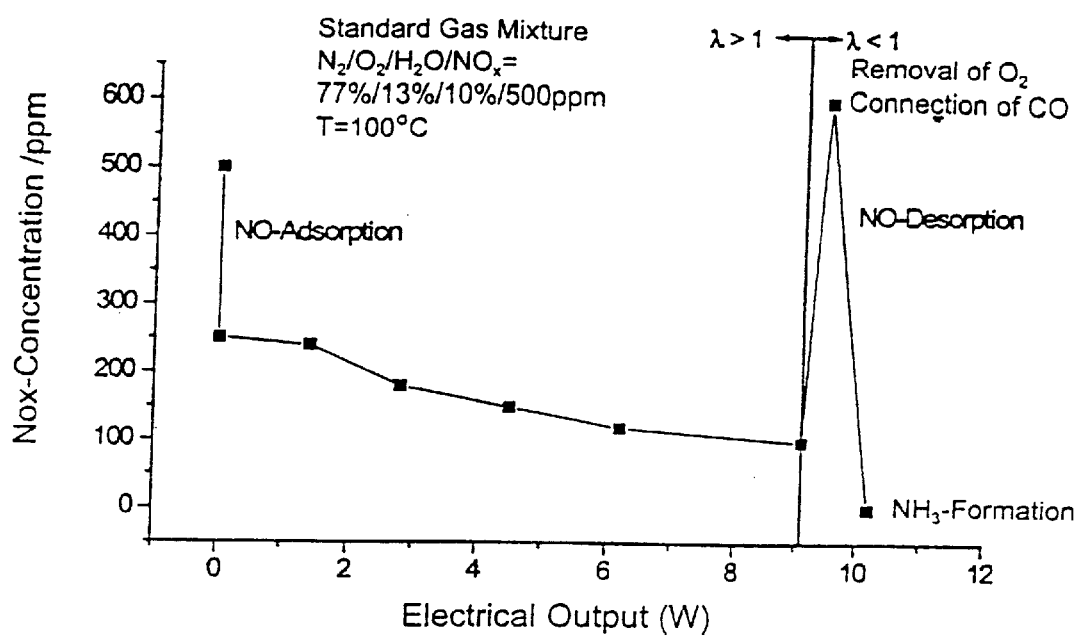
FIG. 9 is a graph of a $No_x$ concentration in the emitted exhaust gas as a function of the electrical power consumption of the gas discharge and the normalised air/fuel-ratio of the exhaust gas.

FIGS. 9 to 12 illustrate the aforedescribed procedures. FIG. 9 shows the change in the concentration of nitric oxide in the synthesis gas behind the plasma reactor as a function of the electrical power coupled to the gas discharge. When the gas discharge is switched off (electrical power 0) the NO concentration of the synthesis gas mixture behind the plasma reactor is 500 ppm according to Table 1. After switching on the gas discharge there is an immediate reduction in the NO concentration. This is attributed to the formation of nitrogen dioxide by the plasma discharge, the nitrogen dioxide being adsorbed very efficiently by the catalyst pellets.

The electrical power coupled to of the plasma discharge was slowly increased. At a power of about 9 watts the composition of the synthesis gas mixture was changed from lean to rich by disconnecting the oxygen and feeding carbon monoxide. FIG. 9 shows that after the changeover of the exhaust gas composition, there is first of all a marked desorption of nitric oxide under the now prevailing reducing exhaust gas conditions. At the same time ammonia is formed by the plasma discharge, which reduces the desorbed nitric oxide in the presence of the catalyst.

Figure 10:
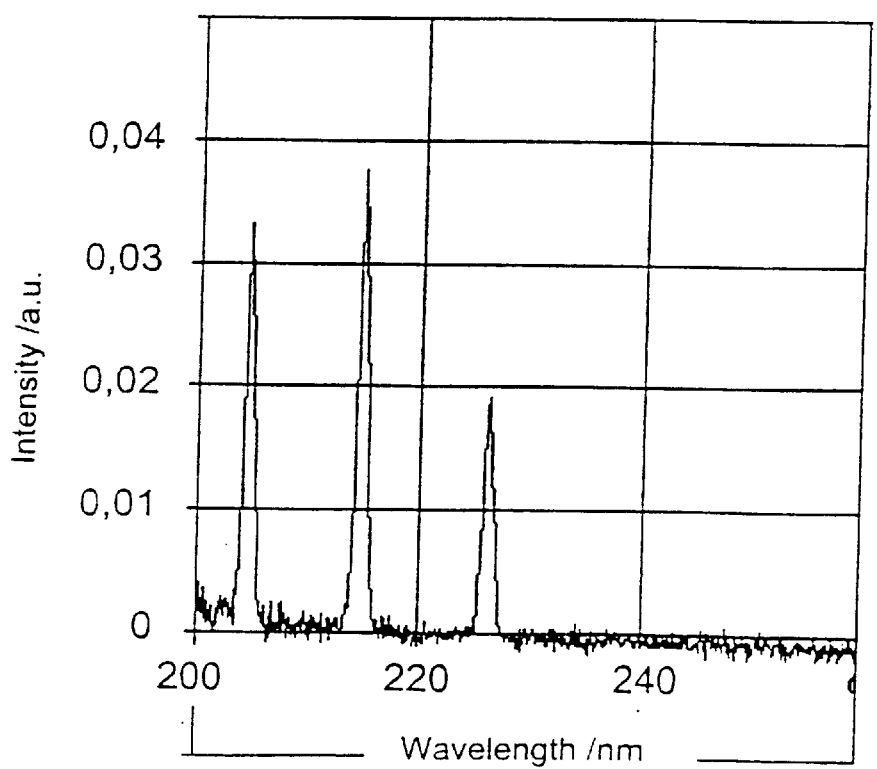
FIG. 10 is a graph of absorption bands of nitric oxide in the lean synthesis gas mixture after flowing through the plasma reactor with the gas discharge disconnected.
Figure 11:
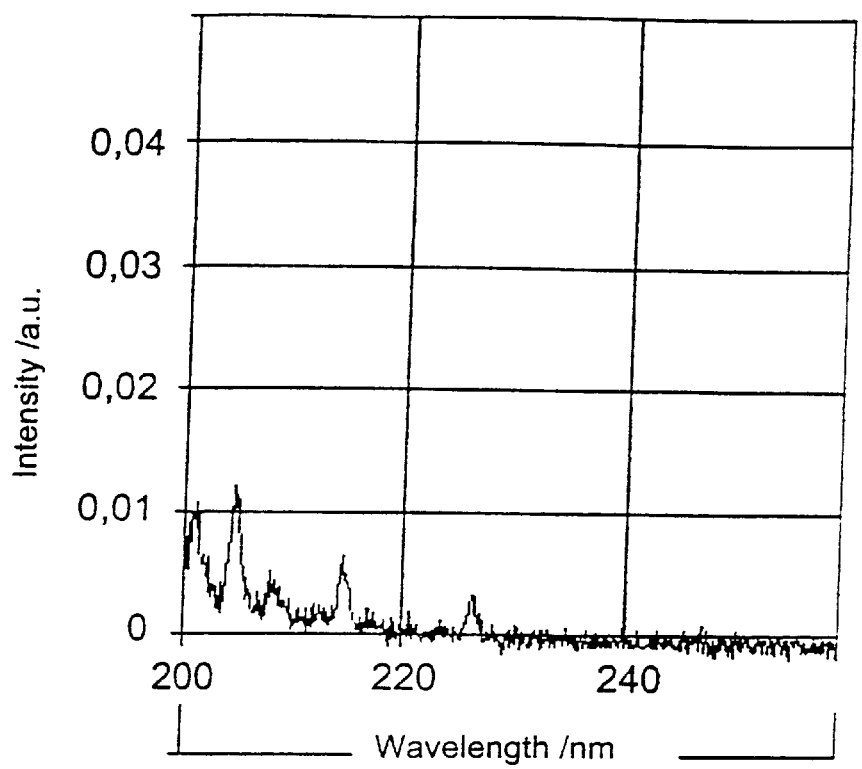
FIG. 11 is a graph of absorption spectrum of the synthesis gas mixture after flowing through the plasma reactor at the moment of switching from a lean gas composition to a rich gas composition.
Figure 12:
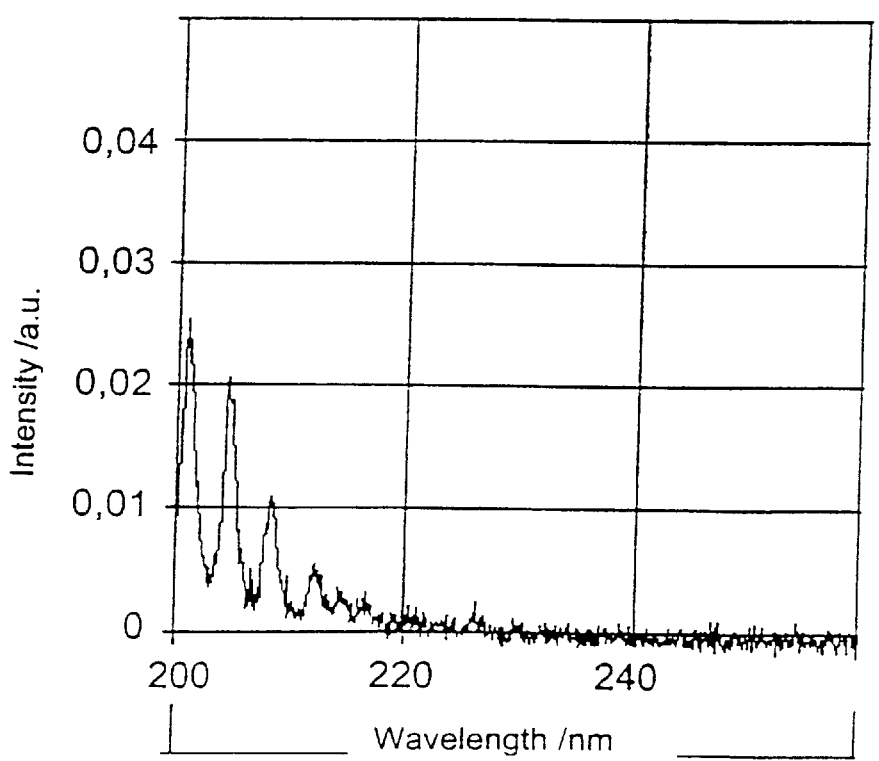

FIGS. 10 to 12 illustrate spectroscopic investigations of the exhaust gas during the lean operating phase, during the changeover from the lean to rich operating mode, and during rich operating phase. During the lean phase the exhaust gas exhibits only the absorption bands of nitric oxide. During the switchover these absorption bands disappear (FIG. 11), while during the rich operating phase the exhaust gas clearly shows the absorption bands of the ammonia that is formed (FIG. 12).

This test was repeated with the following compositions of the pellets in the plasma reactor:

Pt/BaO/γ-$Al_2O_3$
Pt-Pd/BaO/γ-$Al_2O_3$
PT/γ-$Al_2O_3$ $V_2O_5/\gamma\text{-}Al_2O_3$ $\alpha\text{-}Al_2O_3$ In all cases a significant formation of ammonia was found in the gas discharge under reducing exhaust gas conditions.

Further variations and modifications of the foregoing will be apparent to those skilled in the art and are intended to be encompassed by the claims appended hereto.

German priority application 199 03 533.4 is relied on and incorporated herein by reference.

We claim:

1. A process for the selective catalytic reduction of nitrogen oxides contained in a lean exhaust gas from an internal combustion engine with one or more cylinders, comprising:
   a) producing a rich gas stream with a normalized air/fuel-ratio of less than 1,
   b) forming ammonia in the rich gas stream by treating the rich exhaust gas stream in an electrical gas discharge plasma generated between two electrodes,
   c) combining the lean exhaust gas with the rich gas stream, and
   d) reducing the nitrogen oxides contained in the lean exhaust gas on a reduction catalyst using the ammonia as a reducing agent.

2. The process according to claim 1, wherein the rich gas stream is produced by a sub-stoichiometrically operating burner.

3. The process according to claim 1, wherein the rich gas stream forms part of the exhaust gas stream from the internal combustion engine and is obtained by operating one cylinder of the engine with a sub-stoichiometric air/fuel mixture.

4. The process according to claim 1, wherein the rich gas stream is formed by injecting hydrocarbons into an air stream.

5. The process according to claim 1, wherein the reduction catalyst contains the following components:
   a) titanium dioxide;
   b) at least one oxide of tungsten, silicon, boron, aluminum, phosphorus, zirconium, barium, yttrium, lanthanum and cerium, and
   c) at least one oxide of vanadium, niobium, molybdenum, iron and copper.

6. The process according to claim 1, wherein the reduction catalyst comprises a zeolite catalyst that contains copper, iron, cerium or mixtures thereof on a mordenite zeolite.

7. The process according to claim 1, wherein a dielectrically hindered discharge at atmospheric pressure with a product (d*p) of the electrode interspacing and pressure of between 0.05 and 100 mm*bar is used as the gas discharge.

8. The process according to claim 7, further comprising generating the discharge in the annular space between two tubular electrodes arranged concentrically with respect to one another, at least one of which is coated with a dielectric on the mutually opposite jacket surfaces of the tubular electrodes.

9. The process according to claim 7, further comprising: exciting the discharge in the flow channels of a honeycomb body obtained by stacking alternately smooth and corrugated metal sheets on top of one another, wherein either the smooth or corrugated sheets or both types of sheets are coated with a dielectric to achieve electrical insulation from one another, wherein a discharge voltage is applied between all smooth and all corrugated sheets.

10. The process according to claim 9, wherein the discharge is excited with a pulsed voltage having a frequency of between 50 Hz and 250 kHz.

11. The process according to claim 9, wherein the discharge is excited with an alternating voltage between 0.2 and 15 kV and a frequency between 50 Hz and 250 kHz.

12. The process according to claim 9, wherein the electrodes have surfaces which are structured three-dimensional.

13. The process according to claim 9, wherein the dielectric comprises a catalyst coating of finely divided support materials and catalytically active components.

14. The process according to claim 9, wherein a catalyst layer of finely divided support materials and catalytically active components is applied to the coating of the metal sheets with the dielectric.

15. The process according to claim 14, wherein aluminium oxide, titanium oxide, zirconium oxide, cerium oxide, silicon dioxide, magnesium oxide or their mixed oxides and zeolites are used as finely divided support materials.

16. The process according to claim 15, wherein the finely divided support materials are stabilized with silicon dioxide and/or rare earth oxides.

17. The process according to claim 15, wherein the catalyst coating contains at least one of the catalytically active components platinum, palladium, rhodium and iridium in a highly dispersed form.

18. The process according to claim 15, wherein the catalyst coating additionally contains at least one basic oxide of the alkali or alkaline earth metals of the periodic system of the elements.

19. The process according to claim 7, wherein the discharge is generated between two parallel plate electrodes, at least one of which is coated on the mutually opposite faces with a dielectric.

20. The process according to claim 19, wherein a catalyst layer of finely particulate support materials and catalytically active components is applied to the dielectric.

21. The process according to claim 19, wherein the dielectric comprises a catalyst coating of finely particulate support materials and catalytically active components.

22. The process according to claim 21, wherein the alternating voltage is operated in a pulsed manner with a frequency between 0.01 and 10 Hz.

23. The process according to claim 19, wherein the discharge space between the electrodes is filled with ceramic pellets.

24. The process according to claim 23, wherein the ceramic pellets comprise at least one finely divided support material selected from the group consisting of aluminum oxide, titanium oxide, zirconium oxide, cerium oxide, silicon dioxide, magnesium oxide, mixed oxides thereof and zeolites.

25. The process according to claim 24, wherein the finely divided support materials are stabilized with silicon dioxide and/or rare earth oxides.

26. The process according to claim 24, wherein the ceramic pellets contain at least one of the catalytically active components platinum, palladium, rhodium and iridium in a highly dispersed form.

27. The process according to claim 24, wherein the ceramic pellets additionally contain at least one basic oxide of the alkali or alkaline earth metals of the periodic system of the elements.

* * * * *